United States Patent
Hao et al.

(10) Patent No.: US 8,341,239 B2
(45) Date of Patent: Dec. 25, 2012

(54) METHOD AND SYSTEM FOR PROVIDING RUNTIME VULNERABILITY DEFENSE FOR CROSS DOMAIN INTERACTIONS

(75) Inventors: Da Ming Hao, Beijing (CN); Lin Luo, Beijing (CN); Ye Wang, Beijing (CN); Yu Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 657 days.

(21) Appl. No.: 12/546,754

(22) Filed: Aug. 25, 2009

(65) Prior Publication Data
US 2010/0049792 A1 Feb. 25, 2010

(30) Foreign Application Priority Data
Aug. 25, 2008 (CN) .......................... 2008 1 0212617

(51) Int. Cl.
*G06F 15/16* (2006.01)

(52) U.S. Cl. ............................ 709/217; 709/203; 726/22

(58) Field of Classification Search .................. 709/203, 709/217; 726/22
See application file for complete search history.

(56) References Cited

U.S. PATENT DOCUMENTS
2002/0124022 A1* 9/2002 Yoo ................................. 707/513
2006/0212803 A1* 9/2006 Arokiaswamy ................ 715/520
2007/0300160 A1* 12/2007 Ferrel et al. .................... 715/744
2008/0010359 A1* 1/2008 Achtermann et al. ......... 709/217
2009/0327421 A1* 12/2009 Fu et al. ......................... 709/204

OTHER PUBLICATIONS

Bridging the gap between web application firewalls and web applications, L. Desmet et al, Proc.4th ACM workshop on Formal methods in security, Alexandria, VA, pp. 67-77, 2006.
Provable Protection against Web Application Vulnerabilities Related to Session Data Dependencies, Desmet et al., IEEE Trans on Soft Eng., vol. 34, pp. 50-64, Jan.-Feb. 2008.
A survey on web services composition, S. Dustdar et al., Int. J. Web and Grid Services, vol. 1, No. 1, 2005.
Secure, Reliable, Transacted Web Services, D. Furguson et al., Oct. 28, 2003. http://www.ibm.com/developerworks/webservices/library/ws-securtrans/index.html.
Web services: problems and future directions, H. Wang et al., Web Semantics: Science, Services and Agents on the World Wide Web, vol. 1, Issue 3, pp. 309-320, Apr. 2004.
The XMLHttpRequest Object, W3C Working Draft Apr. 15, 2008 http://www.w3.org/TR/XMLHttpRequest/ Jul. 29, 2009.

* cited by examiner

*Primary Examiner* — David Lazaro
*Assistant Examiner* — Marie Georges Henry
(74) *Attorney, Agent, or Firm* — Vazken Alexanian (57) ABSTRACT

A runtime vulnerability defense method, system, and computer readable article of manufacture tangibly embodying computer readable instructions for executing the method for cross domain interactions for a Web application. The method includes: creating a first and second iFrame object by the Web application which belong to a lower domain; creating an object O by the first iFrame object; sharing the created object O by the second iFrame object; promoting the domain of the second iFrame object to an upper domain; creating in the shared object O a source accessing function for submitting to a third party server a request to access the content of the third party server; and creating in the shared object O a sanitization function for sanitizing the response received from the server.

15 Claims, 6 Drawing Sheets

METHOD AND SYSTEM FOR PROVIDING RUNTIME VULNERABILITY DEFENSE FOR CROSS DOMAIN INTERACTIONS

CROSS-REFERENCE TO RELATED APPLICATION

This application claims priority under 35 U.S.C. §119 from Chinese Patent Application No. 200810212617.4 filed on Aug. 25, 2008, the entire contents of which are incorporated herein by reference.

BACKGROUND OF THE INVENTION

1. Field of the Invention

The invention generally relates to Web applications, and more particularly relates to a method and system for providing a runtime vulnerability defense for cross domain interactions for a Web application.

2. Description of Related Art

A Web application is defined as a Web-based application which means any application program for which the user interface resides in a Web browser. It is a collection of particular web pages and other resources for completing specific tasks. A Web application is a product of client/server architecture. It enables a client and a server to communicate with each other over a network. The common message boards, chat rooms, and bulletin board systems (BBS) are all Web applications. These applications, however, are relatively simple. The real core function of a Web application is to handle data.

Recently, along with the development of Software-as-a-Service (SaaS) applications, there is a need to combine contents from multiple sources, which reside in different domains, into an integrated content. An SaaS application is a kind of Web application. It is an innovative software application mode that is gradually developed along with Internet technologies and the maturing of application programs.

SaaS is a method of software supply over the Internet, in which a supplier makes a unified deployment of application software on its own server. A user can subscribe to a required application software service by way of a supplier over the Internet based on the user's actual requirement, make payment to the supplier according to the extent and time length of the subscribed service, and acquire the service offered by the supplier over the Internet. It is not necessary for the user to purchase software. Instead, the user hires Web-based software from the supplier to manage enterprise business operations. The user does not need to maintain software. Such software will be managed and maintained by the supplier. Simultaneously with providing Internet applications to customers, the supplier also provides off-line operations for software and local data storage in order to enable the user to utilize his subscribed software and service at any time and any place.

In the context of a Web application like an SaaS application, there is always a need to combine contents from multiple sources. For example, in a Sales Force Automation (SFA) application, there can be a need to integrate contact management information from another server into the application. Here, cross domain content interaction is required. In practice, since an SaaS application often needs to combine data from other sources residing in different domains, it will have to make a choice between security and functionality. In some traditional approaches, the considerations for security often relate to the approaches listed below. However, each has its own limitations.

Input validation: The function of input validation is mainly to filter user-inputted values based on pre-defined patterns. If, however, a user gets the content directly from a third party service, the input validation function will be bypassed, such that a potential and malicious attack from the content cannot be prevented.

Browser-side plug-in: A browser-side plug-in, such as a Flash plug-in, can support communications between various domains and provide multiple cross domain capabilities. However, for the sake of security, privacy, or compatibility, some users do not want to install a browser-side plug-in.

Server-side proxy: A server-side proxy filters data from a third party server, and makes the data appear to be same-origin data to the client side. Thus, the browser can first connect to the proxy to retrieve third party contents. A disadvantage of this approach is that it increases latency when connecting to the third party server through the proxy.

Fragment identifier messaging: Some approaches can utilize fragment identifiers to implement cross domain communication. Such approaches append #message to the end of a Uniform Resource Locator (URL) for transmitting a message. A disadvantage of such approaches is that the communication can be easily disrupted when a user clicks on the browser's "back" button. Further, there is a length constraint for the message to be transmitted.

In many current Web applications, the cross domain interaction is performed with an AJAX-based rich Web application. The term AJAX is a shortening of "Asynchronous JavaScript+XML." The core of AJAX, a JavaScript object XmlHttpRequest, supports asynchronous requests. In brief, the object XmlHttpRequest allows client-side JavaScript scripts to make a request to the server and process the response, without refreshing the page in the browser and without blocking the user.

The detailed definition and description of the object XmlHttpRequest can be referred to the specification of World Wide Web Consortium (W3C), at the Web address http://www.w3.org/TR/XMLHttpRequest. However, in consideration of security, an AJAX-based rich Web application can only access resources in the current domain where the application is located, and cannot implement cross domain access. This is referred to as the policy of same-origin constraint. For example, an AJAX in a site domain1.com can only access resources in that site, and cannot make a cross domain access to resources in a site domain2.com. In SaaS applications, however, a Web application belonging to some domain sometimes needs to make an AJAX request to a server belonging to another domain, in order to invoke services or resources on the server. The above-stated cross domain access is subject to the constraint of the existing XMLHttpRequest implementations.

A rich Web application can also provide a new service, which returns a response in the format of JavaScript Object Notation (JSON) instead of XML. JSON is a lightweight computer data interchange format. It is a text-based, human-readable format for representing simple data structures and associative arrays or objects. The JSON format is often used for transmitting structured data over a network connection. JSON can be created in the following two structures: a set of "name/value" pairs, which can be considered as object, record, structure, dictionary, hash table, keyed list, associative array; or an ordered value list. In most languages, it is configured in array form. Therefore, it is possible to exchange the same data format between programming languages that are based on the same structures.

In fact, if a Web service request is made with a dynamic script tag approach, and a JavaScript callback function is specified, then it is possible to implement free access to Web services in a seamless, cross-site manner. In this regard, JSON with padding (JSONP) is proposed to act as a standard for obtaining JSON from an external domain, where a callback function is specified as an input variable of the call itself. However, there is a security problem with JSONP when retrieving data from a third party service, since it cannot prevent a malicious attack by the third party data.

Figure 1:
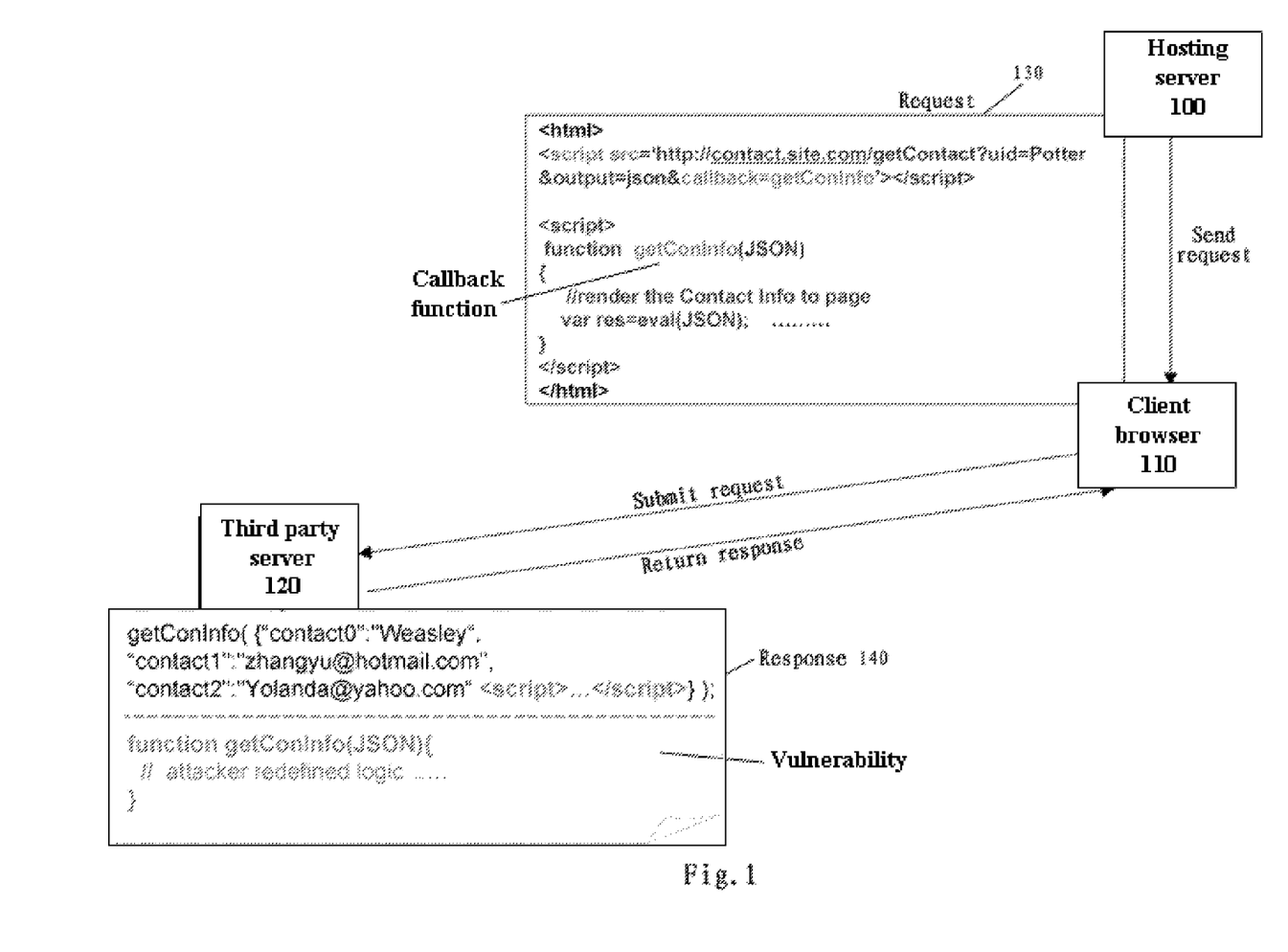
FIG. 1 illustrates an exemplary diagram of a Web application performing a vulnerability attack for a cross domain interaction with JSONP.

For example, FIG. 1 illustrates an exemplary diagram of a Web application performing a vulnerability attack for a cross domain interaction with JSONP. As shown in FIG. 1, a hosting server 100 communicates with a client browser 110. The client browser 110 communicates with a third party server 120, where the hosting server 100 hosts Web applications to be performed on the client browser 110. Thus, the hosting server 100 submits a request 130 to the third party server 120 for accessing third party contents through the client browser 110.

In the request 130, a callback function, getConInfo, is specified and defined for presenting to a user the information provided by the third party server 120. The information in this example is contact information. This callback function refers to a function that can be used by the third party server 120 in the returned response 140. In a normal circumstance, the third party server 120 provides the user with the contact information in the format of JSON with the specified callback function, getConInfo. Then, the browser 110 can receive and read the information in the format of JSON, and present the information to the user in the form specified in the callback function.

In practice, the approach is vulnerable to malicious attacks. In one circumstance, as shown in the upper part of the response 140 in FIG. 1, a malicious attacker can append some malicious codes to the normal contact information, which is located between <script> and </script>. In this way, when the client browser 110 receives the response information and performs the callback function, the malicious codes will be performed at the same time, so that the client is at risk.

For example, sensitive information of the client can be revealed, or malicious scripts can be embedded into the client. In another circumstance, as shown in the lower part of the response 140 in FIG. 1, a malicious attacker can define a new function in the response information. The function shown has the same name as the callback function, getConInfo. The malicious attacker can embed malicious scripts, located between <script> and </script>, into the new function. In this way, when the client browser 110 receives the response information and performs the callback function, the new function defined by the malicious attacker, instead of the callback function defined by the client, will actually be performed, so that the client is at risk.

It can be seen from the above analysis that the various approaches to the problem of Web application vulnerability have disadvantages in that they cannot satisfy the requirements of both security and functionality simultaneously. Thus, to enable Web applications, especially SaaS applications, to interact with other domains for obtaining and incorporating data from other domains while taking sufficient security into account, there is a need for a method and system for providing a runtime vulnerability defense for cross domain interactions for Web applications.

SUMMARY OF THE INVENTION

According to an aspect of the present invention, a method for providing, by a computing device, a runtime vulnerability defense for cross domain interactions for a Web application is provided. The method includes: creating a first iFrame object and a second iFrame object by the Web application, wherein the first and second iFrame objects belong to a lower domain; creating an object O by the first iFrame object; sharing the created object O by the second iFrame object; promoting, by a domain promotion module, the domain of the second iFrame object to an upper domain; creating, in the object O that is shared, a source accessing function by the second iFrame object for submitting to a third party server a request to access the content of the third party server; and creating, in the object O that is shared, a sanitization function by the first iFrame object for sanitizing the response received by the second iFrame object from the third party server, thereby providing runtime vulnerability defense for cross domain interactions.

According to yet another aspect, the present invention provides a system for a runtime vulnerability defense for cross domain interactions for a Web application. The system includes: an iFrame creating module for creating a first iFrame object and a second iFrame object by the Web application, wherein the first and second iFrame objects belong to a lower domain; an object sharing module for creating an object O by the first iFrame object, and having the second iFrame object share the created object O; a domain promotion module for promoting the domain of the second iFrame object to an upper domain; and a function creating module for (i) creating in the shared object O a source accessing function by the second iFrame object, (ii) submitting to a third party server a request to access the content of the third party server, (iii) creating in the shared object O a sanitization function by the first iFrame object, and (iv) sanitizing the response received by the second iFrame object from the third party server.

According to still another aspect, the present invention provides a computer readable article of manufacture tangibly embodying computer readable instructions which, when executed, causes a computer device to implement a method for providing a runtime vulnerability defense for cross domain interactions for a Web application as described above.

The method and system of the invention avoid large-scale rewriting of background codes. Therefore, while the functionality requirements of the system for cross domain interactions of Web applications are maintained, the vulnerability defense for the system is enhanced. Further, it is possible to provide transparent runtime security protection instantly, without the need for changing back-end application logic. Furthermore, when the method and system of the invention is implemented as a Web application firewall (WAF), there is no need for a client browser plug-in to be installed, nor is there a need for a proxy at the server side, thereby reducing the request latency and increasing the overall efficiency of the system.

BRIEF DESCRIPTION OF THE DRAWINGS

The embodiments of the present invention and its preferred mode, together with further objects and advantages, will be appreciated from the following detailed description of the illustrative embodiments taken in conjunction with the drawings. It is noted that the same or similar labels designate the same or similar elements or components throughout the figures.

DETAILED DESCRIPTION OF THE PREFERRED EMBODIMENTS

The exemplary embodiments of the invention will be described below in conjunction with the accompanying figures. For clarity and simplicity, not all features of the actual implementation are described in the specification. However, it should be appreciated that many implementation-specific decisions must be made in the process of developing any of the embodiments in order to realize the particular objectives of developers, for example complying with those limiting conditions in related to systems and businesses, wherein the limiting conditions can be varied depending on the implementation. Further, it should be appreciated that although the development effort can be complicated and time-consuming, such development effort is only a routine task for those skilled in the art that benefit from this disclosure. Moreover, it is further noted that, in order not to obscure the invention by unnecessary details, only the apparatus structures and/or process steps according to embodiments of the present invention are shown in the accompanying figures, while details not relative to the invention are omitted.

In the following descriptions of the present invention, the method of the invention can be implemented with a Web application firewall (WAF). The Web application firewall can be a hardware component, which, for example, can act as a communication intermediary between a server and a client browser, i.e., any communication between the server and the client will pass through the WAF. Thus, installing a client browser plug-in is not needed. Similarly, a proxy at the server side is also not needed. As a result, the request latency is reduced and the overall efficiency of the system is increased. It can be appreciated by those skilled in the art that in other embodiments of the present invention, the method of the invention can also be implemented as a client plug-in or a proxy on the server side.

Figure 2:
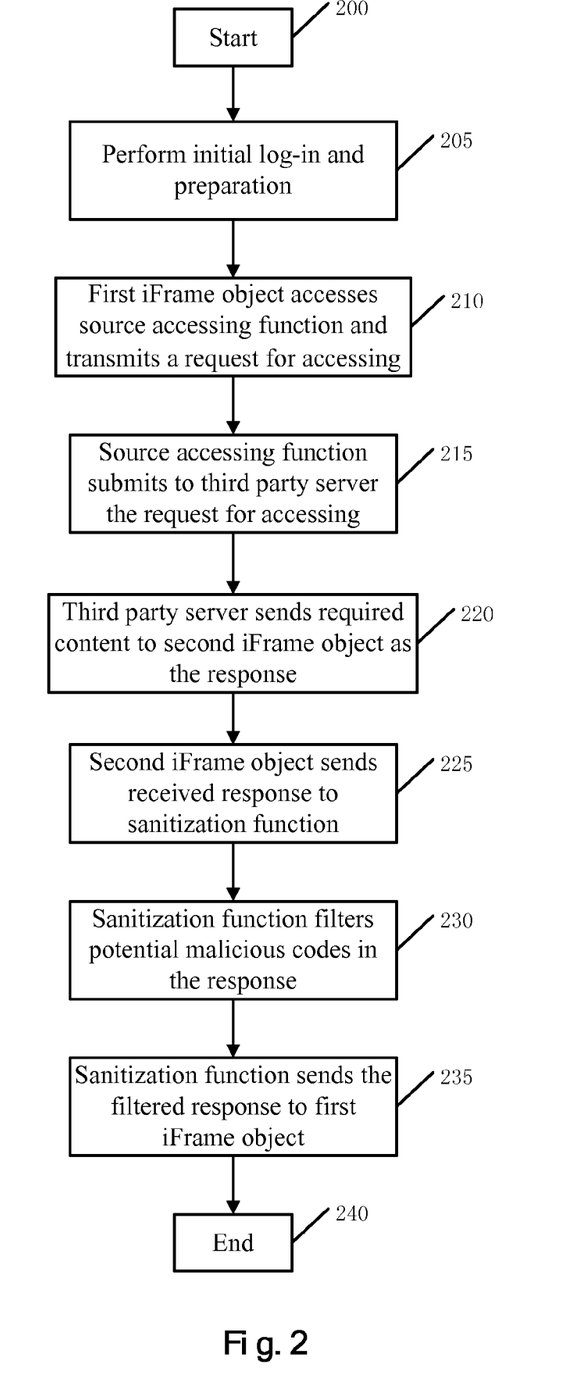
FIG. 2 illustrates an exemplary flow chart of a method for providing a runtime vulnerability defense for cross domain interactions for a Web application according to one embodiment of the present invention.

Referring to FIG. 2, an exemplary flow chart of a method for providing a runtime vulnerability defense for cross domain interactions for a Web application according to an embodiment of the present invention is illustrated. As shown in FIG. 2, the method starts at step 200, and proceeds to step 205. At step 205, the respective steps of an initial log-in and preparation phase are performed. The initial log-in and preparation phase can be performed in response to a request issued by the client to the server. In particular, an exemplary flow chart of the initial log-in and preparation phase is illustrated as follows in FIG. 3.

Figure 3:
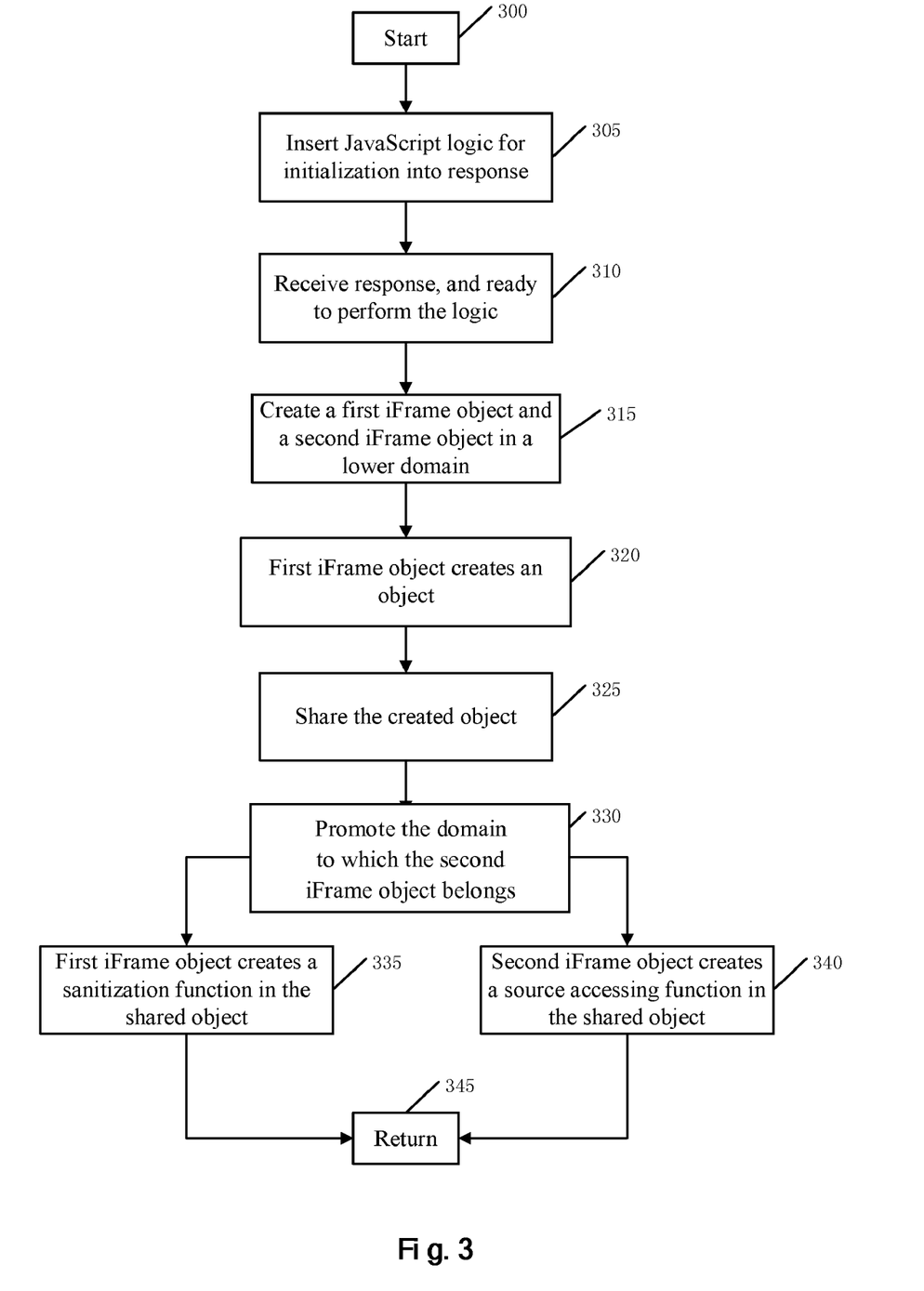
FIG. 3 illustrates an exemplary flow chart of the initial log-in and preparation phase.
Figure 4:
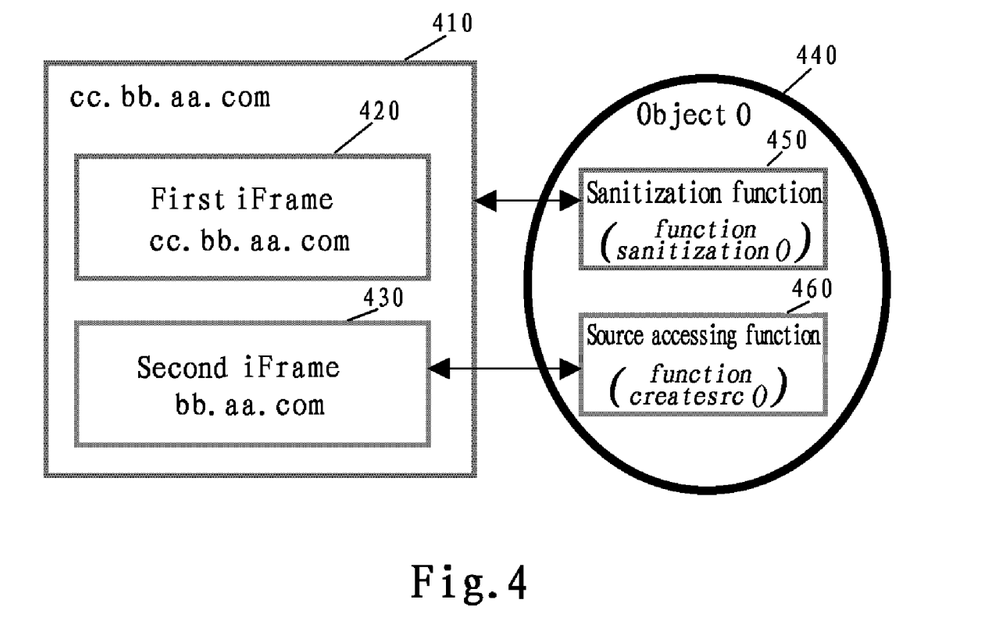
FIG. 4 illustrates a schematic page view after the initial log-in and preparation phase of FIG. 3 is completed.

As shown in FIG. 3, the initial log-in and preparation phase starts at step 300, and proceeds to step 305. First, at step 305, a JavaScript logic for initialization is inserted into a response sent from the server to the client. As stated above, this step can be performed by the WAF. At step 310, the modified response is received by the client, so that the client can perform the JavaScript logic inserted into the response. As such, according to the logic, at step 315, a first iFrame object and a second iFrame object are created in a page of a lower domain, which is a domain for actually obtaining and presenting contents of a third-party server to the user, for example, cc.bb.aa.com. At this point, the first iFrame object and the second iFrame object belong to the lower domain. In order to better understand the initial log-in and preparation phase of FIG. 3, FIG. 4 illustrates a schematic page view after the initial log-in and preparation phase of FIG. 3 is completed. As shown in FIG. 4, 410 represents the initial browser page, whose domain is cc.bb.aa.com, in which a first iFrame object 420 and a second iFrame object 430 are created.

The "iFrame", which can also be called an embedded element or an embedded frame, can embed frames and contents of a web page into an existing HTML web page as a sub-window of the existing HTML web page. An iFrame can be embedded into any part of an HTML web page. One of its main characteristics is that the HTML file referenced by the iFrame is not displayed independently of the other HTML file, but can be directly embedded into the latter HTML file. The two HTML files, however, are independent of each other. One file is not treated as a part of the other, but each file is treated as a whole file. Moreover, an iFrame can display the same content in different pages repeatedly, without rewriting the content. Through the object model in the page where the iFrame object is located, the attributes, not the content, of the iFrame object can be accessed, thereby ensuring security. The created iFrame can be used for enabling the cross domain interaction of a web page. The size of an iFrame can be adjusted. Therefore, the iFrame can be invisible so that users cannot see it in the user interface (UI).

At step 320, a JavaScript object O 440 is created by the first iFrame object 420. The object O 440 is for creating functions for submitting a request for accessing the content of the third party server and sanitizing the content. The particular operation of these functions will be described in the following. At step 325, the second iFrame object 430 is enabled to share the created object O 440 with the first iFrame object 420. Here, both of the iFrame objects can access the shared object O 440. The object O 440 has the same security permit as the page where it is located.

At step 330, the domain to which the second iFrame object 430 belongs is promoted. For example, the domain to which the second iFrame object 430 belongs is promoted to an upper domain relative to the original lower domain, for example, bb.aa.com. According to the security attribute specification, the promotion of a domain to which an iFrame object belongs can only be performed by promoting it to an upper domain. Therefore, in an alterative embodiment, the lower domain can also be promoted to aa.com. The upper domain can be a virtual domain, i.e., in the upper domain, any useful data or sensitive data is not included.

The scope of the effective access to the upper domain is restricted only to the second iFrame object 430. Thus, it is possible to isolate the domain to which the second iFrame object 430 belongs, so that it can act as an intermediary for receiving and processing the content from the third party server. If there are some potential malicious codes in the third party content, the malicious codes can only take effect in the upper domain, and cannot access the original lower domain so that any sensitive information located in the lower domain will not be stolen and malicious codes cannot be embedded into the lower domain.

At step 335, a sanitization function 450 is created in the shared object O 440 by the first iFrame object 420, for example, function sanitization( ), for sanitizing the content from the third party server. At step 340, a source accessing function 460 is created in the shared object O 440 by the second iFrame object 430, for example, function createsrc( ), for submitting a request to the third party server for access to its content. Since the two functions are created in the object O 440, both of them inherit the security permit of the page where the object O 440 is located. Since the first and second iFrame objects share the object O 440, both the first iFrame object 420 and the second iFrame object 430 can access the source accessing function and the sanitization function. However, as a result of the same-origin policy, neither can the source accessing function 460 access the first iFrame object 420 in the reverse direction, nor can the sanitization function 450 access the second iFrame object 430 in the reverse direction. Steps 335 and 340 can be performed successively or simultaneously. Then, the initial log-in and preparation phase completes, and returns at step 345.

Now returning to FIG. 2, after the initial log-in and preparation phase at step 205 is completed, the client can request and process the content of the third party server in a secure manner. In order to better understand the method of FIG. 2, FIG. 5 illustrates a specific implementation for performing cross domain interactions in the schematic page view of FIG. 4.

Figure 5:
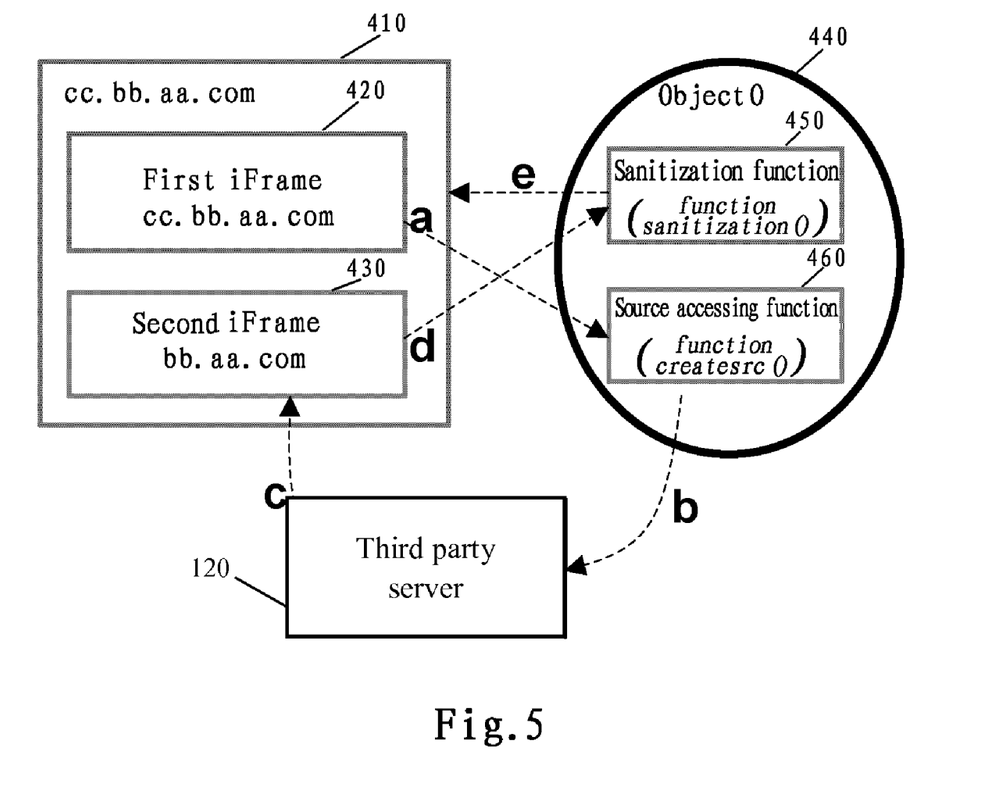
FIG. 5 illustrates a particular implementation of performing cross domain interaction in the schematic page view of FIG. 4.

First at step 210 of FIG. 2, the first iFrame object 420 of FIG. 5 accesses the source accessing function 460 created in the shared object O 440, and transmits a request for accessing the content of the third party server 120 to the source accessing function 460, as shown by the arrow a in FIG. 5. At step 215, the source accessing function 460 submits a request to the third party server 120 for accessing the content on the server, as shown by the arrow b in FIG. 5. At step 220, in response to the request, the third party server 120 sends the required content to the second iFrame object 430 as the response in the format of JSON, as shown by the arrow c in FIG. 5. As stated above, since the second iFrame object 430 belongs to a promoted isolated domain, for example, bb.aa.com, and no sensitive information is included, even if any malicious codes are contained in the response from the third party server 120, other domains cannot be accessed, for example, the lower domain cc.bb.aa.com. As a result, sensitive information located in other domains cannot be obtained, nor can malicious codes be embedded into other domains. Thus, the two malicious attack methods, namely embedding malicious script codes and redefining a new function with the same name to override the original callback function cannot take effect, as shown above in the response 140 of FIG. 1.

At step 225, the second iFrame object 430 sends the response received from the third party server 120 to the sanitization function 450 created in the shared object O 440, as shown by the arrow d in FIG. 5. At step 230, the sanitization function 450 can traverse the whole response in order to filter any potential malicious codes there. For example, the sanitization function 450 can access a pre-stored malicious code list, and delete the corresponding malicious codes that can be embedded in the response content. It should be appreciated that other information filtering methods well-known by those skilled in the art are also possible, all of which fall into the scope of the present invention.

Afterwards, at step 235, the sanitization function 450 sends the filtered response to the first iFrame object 420, as shown by the arrow e in FIG. 5. Since the sanitization function 450 is created by the first iFrame object 420, it can be communicated with the first iFrame object 420. After the sanitization of the response content, the first iFrame object 420 can freely utilize the content from the third party server 120, and does not need to consider security issues. The method ends at step 240.

As stated above, according to the method of the present invention, the large-scale rewriting of background codes is avoided. Therefore, while the functionality requirements of cross domain interaction of a Web application for the system is maintained, the vulnerability defense for the system is enhanced. Further, it is possible to provide transparent runtime security protection instantly, without the need for changing back-end application logic.

It is noted that the process of performing domain promotion is shown as being executed only once. However, in practice, it is possible to perform domain promotion more than once to further improve security. In this example, if three iFrame objects are created, then the original domain to which the first iFrame object belongs is cc.bb.aa.com, the domain to which the second iFrame object belongs is promoted to bb.aa.com, and the domain to which the third iFrame object belongs is promoted to aa.com. The remaining steps are similar to the above-stated ones, so that they are not described again. With such more-than-once domain promotion, the method of the present invention will yield higher security.

Figure 6:
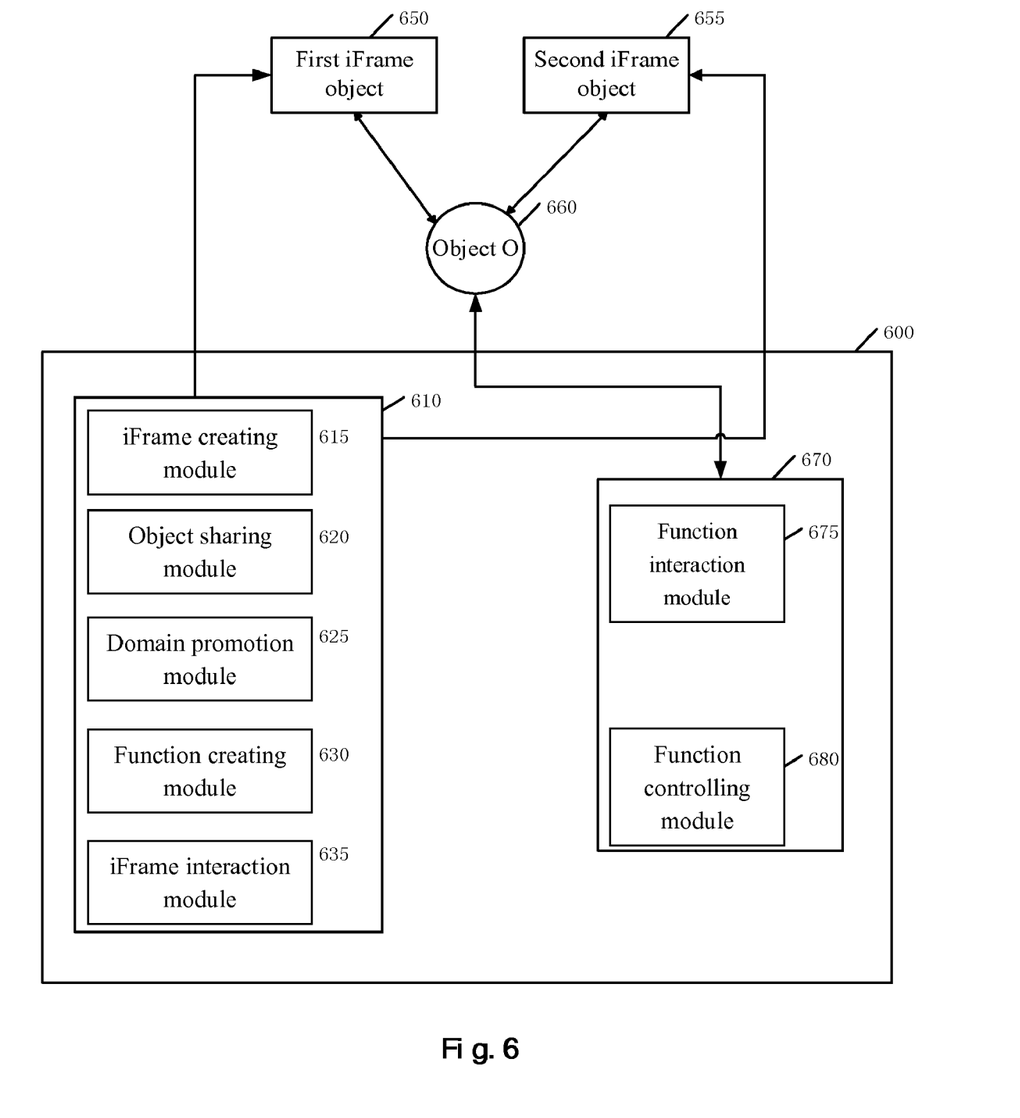
FIG. 6 illustrates a schematic block diagram of a system for providing a runtime vulnerability defense for cross domain interactions for a Web application according to an embodiment of the present invention.

The detailed descriptions of a method for providing a runtime vulnerability defense for cross domain interactions for a Web application according to an embodiment of the present invention are provided above. According to the same inventive concept, a system 600, shown in FIG. 6, is provided for a runtime vulnerability defense for cross domain interactions for a Web application according to an embodiment of the present invention.

In the system 600, a Web application performs a cross domain interaction. As shown in FIG. 6, the system 600 includes an iFrame controlling module 610 and an object controlling module 670. In particular, in the system 600, the iFrame controlling module 610 can include: an iFrame creating module 615, an object sharing module 620, a domain promotion module 625, a function creating module 630, and an iFrame interaction module 635.

The iFrame creating module 615 is creates a first iFrame object 650 and a second iFrame object 655 in a web page, where both of the iFrame objects belong to a lower domain of the web page where they are located. The lower domain is a domain for actually obtaining and presenting the content of the third-party server to the user.

The object sharing module 620 creates an object O 660 and enables the second iFrame object 655 to share the object. The domain promotion module 625 promotes the lower domain to which the second iFrame object 655 belongs to an upper domain, where the upper domain is a virtual domain in which sensitive data is not included. The function creating module 630 creates a source accessing function by the second iFrame object 655 in the shared object O 660 and submits a request to a third party server for accessing the content there.

The function creating module 630 also creates a sanitization function by the first iFrame object 650 in the shared object O 660 and sanitizes the response received by the second iFrame object 655 from the third party server. The iFrame interaction module 635 controls the interactions of the first iFrame object 650 and the second iFrame object 655 with the source accessing function and the sanitization function in the shared object O 660 and the third party server.

The interactions can include: transmitting by the first iFrame object 650, a request for accessing the content of the third party server to the source accessing function in the shared object O 660; receiving by the second iFrame object 655, the required content from the third parry server; sending by the second iFrame object 655, the received content to the sanitization function in the shared object O 660; and receiving by the first iFrame object 650, the filtered content from the sanitization function in the shared object O 660.

In the system 600, the object controlling module 670 can include: a function interaction module 675 and a function controlling module 680. The function interaction module 675 controls the source accessing function and the sanitization function in the shared object O 660 with the first iFrame object 650 and the second iFrame object 655 and the third party server. The interactions can include: receiving by the source accessing function, a request for accessing the content of the third party server from the first iFrame object 650, and submitting the request to the third party server; receiving by the sanitization function, the content of the third party server from the second iFrame object 655, and sending the filtered content to the first iFrame object 650. The function controlling module 680 controls the operations of the functions created in the shared object O 660. The operations can include: filtering by the sanitization function, the content of the third party server received from the second iFrame object 655.

The operations of system 600 can be activated by inserting JavaScript logic into the original response received by the Web application from the hosting server. Further, the system 600 can be implemented as a Web application firewall, or as a client plug-in, or a proxy at the server side.

The method and system for providing runtime vulnerability defense for cross domain interactions for a Web application are described in detail above. As will be appreciated by a person of ordinary skill in the art, the present invention can be embodied as a method, a system, and/or a computer program product.

Therefore, the present invention can be implemented as entirely hardware, entirely software, or a combination of software and hardware. Additionally, the present invention can be implemented as a computer program product contained on machine-readable media where the computer executable program instructions for programming a computer system to execute the process according to the invention are stored. The term "machine-readable media" used here includes any media that provide the computer system with instructions for execution. Such media can take various forms, including but not limited to: non-volatile media, volatile media, and transmission media. Non-volatile media commonly include, for example, floppy disk, floppy magnetic disk, hard disk, magnetic tape, or any other magnetic media, CD-ROM or any other optical media, slotted card or any other physical media with hole patterns, PROM, EPROM, EEPROM, flash memory, any other memory chip or cartridge, or any other media that can be read by the computer system and are appropriate for storing instructions.

A data processing system suitable for storing and/or executing the program code will include at least one processor coupled directly or indirectly to memory elements through a system bus. The memory elements can include local memory employed during actual execution of the program code, bulk storage, and cache memory, which provides temporary storage of at least some program code in order to reduce the number of times that code must be retrieved from bulk storage during execution.

Additionally, it should be appreciated that each block in the flow chart or block diagram and the combination of some blocks can be implemented by some computer program instructions. These computer program instructions can be provided to a general purpose computer, a specific purpose computer, or a processor device or other programmable data processing devices, to produce a machine, in which these instructions, when executed by a computer or a processor device or other programmable data processing devices, can embody the system for implementing the functions indicated by the blocks of a block diagrams and/or a flow chart.

While the present invention has been described with reference to what are presently considered to be the preferred embodiments, it is to be understood that the present invention is not limited to the disclosed embodiments. On the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for providing, by a computing device, a runtime vulnerability defense for cross domain interactions for a Web application, the method comprising:
    creating a first iFrame object and a second iFrame object by the Web application, wherein the first and second iFrame objects belong to a lower domain;
    creating an object O by the first iFrame object;
    sharing the created object O by the second iFrame object;
    promoting, by a domain promotion module, the domain of the second iFrame object to an upper domain;
    creating, in the object O that is shared, a source accessing function by the second iFrame object for submitting to a third party server a request to access the content of the third party server; and
    creating, in the object O that is shared, a sanitization function by the first iFrame object for sanitizing the response received by the second iFrame object from the third party server, thereby providing runtime vulnerability defense for cross domain interactions.

2. The method according to claim 1, further comprising:
    transmitting, by the first iFrame object, a request to access the content of the third party server to the source accessing function;
    submitting, by the source accessing function, the request to the third party server;
    receiving, by the second iFrame object, the requested content from the third party server;
    receiving, by the sanitization function, the content from the second iFrame object;
    filtering, by the sanitization function, from the content a malicious code if such a code is present to produce a filtered content; and
    receiving, by the first iFrame object, the filtered content from the sanitization function thereby executing the defence.

3. The method according to claim 1, wherein the method is activated by a JavaScript logic received by the Web application.

4. The method according to claim 1, wherein the method is implemented as a Web application firewall.

5. The method according to claim 1, wherein the method is implemented by a client plug-in or a proxy at the server.

6. The method according to claim 1, wherein the lower domain is used for obtaining and presenting to a user, the content of the third party server.

7. The method according to claim 1, wherein the upper domain is a virtual domain in which sensitive data is not included.

8. A system for providing a runtime vulnerability defense for cross domain interactions for a Web application, the system comprising a processor configured to:
   create a first iFrame object and a second iFrame object by the Web application, wherein the first and second iFrame objects belong to a lower domain;
   create an object O by the first iFrame object, and having the second iFrame object share the created object O;
   promote the domain of the second iFrame object to an upper domain; and
   (i) create in the shared object O a source accessing function by the second iFrame object, (ii) submit to a third party server a request to access the content of the third party server, (iii) create in the shared object O a sanitization function by the first iFrame object, and (iv) sanitize the response received by the second iFrame object from the third party server.

9. The system according to claim 8, wherein the processor is further configured to:
   transmit, by the first iFrame object, a request for accessing the content of the third party server to the source accessing function;
   submit, by the source accessing function, the request to the third party server;
   receive, by the second iFrame object, the requested content from the third parry server,
   receive, by the sanitization function, the content from the second iFrame object;
   filter, by the sanitization function, from the content a malicious code if such a code is present to produce a filtered content; and
   receive, by the first iFrame object, the filtered content from the sanitization function, thereby executing the defence.

10. The system according to claim 8, wherein the operations of the system are activated by JavaScript logic received by the Web application.

11. The system according to claim 8, wherein the system is implemented as a Web application firewall.

12. The system according to claim 8, wherein the system is implemented as a client plug-in or a proxy at the server.

13. The system according to claim 8, wherein the lower domain is used for obtaining and presenting to a user, the content of the third-party server.

14. The system according to claim 8, wherein the upper domain is a virtual domain, in which sensitive data is not included.

15. A non-transitory computer readable article of manufacture tangibly embodying computer readable instructions which, when executed, causes a computer device to implement a method for providing a runtime vulnerability defense for cross domain interactions for a Web application, the method comprising the steps of:
   creating a first iFrame object and a second iFrame object by the Web application, wherein the first and second iFrame objects belong to a lower domain;
   creating an object O by the first iFrame object;
   sharing the created object O by the second iFrame object;
   promoting, by a domain promotion module, the domain of the second iFrame object to an upper domain;
   creating, in the object O that is shared, a source accessing function by the second iFrame object for submitting to a third party server a request to access the content of the third party server; and
   creating, in the object O that is shared, a sanitization function by the first iFrame object for sanitizing the response received by the second iFrame object from the third party server, thereby providing runtime vulnerability defense for cross domain interactions.

* * * * *